United States Patent

[11] 3,602,409

| | | |
|---|---|---|
| [72] | Inventor | Robert L. Kerns<br>221 Wellington Road, Dewitt, N.Y. 13214 |
| [21] | Appl. No. | 785,080 |
| [22] | Filed | Dec. 19, 1968 |
| [45] | Patented | Aug. 31, 1971 |

[54] MULTI-CAMERA CARRIER
4 Claims, 6 Drawing Figs.

[52] U.S. Cl. .................................................. 224/5 V, 224/5 R
[51] Int. Cl. .................................................. A45f 5/00
[50] Field of Search ...................................... 224/5, 5.26

[56] References Cited
UNITED STATES PATENTS

| | | | |
|---|---|---|---|
| 3,305,148 | 2/1967 | Zimmerman | 224/5.22 |
| 3,326,432 | 6/1967 | Banks et al. | 224/5.22 |

FOREIGN PATENTS

| | | | |
|---|---|---|---|
| 124,261 | 3/1919 | Great Britain | 224/5.3 |
| 713,967 | 8/1954 | Great Britain | 224/5.15 |

*Primary Examiner*—Gerald M. Forlenza
*Assistant Examiner*—Frank E. Werner
*Attorney*—F. P. Keiper ABSTRACT: Camera harness including a neck band having spaced "D" rings embedded in each end, and three pairs of straps having swivel spring closed hooks at both ends depending from the rings and each pair being adapted to support a camera at different levels over the wearer's chest.

PATENTED AUG 31 1971 3,602,409

INVENTOR.
ROBERT L. KERNS.
BY
ATTORNEY

MULTI-CAMERA CARRIER

This invention relates to a harness for camera carrying.

In photography, it is desirable to carry more than one camera in order to be ready to take action pictures in either black and white, or colored photos, or photos by means of a camera having a special lens. In order to carry as many as three, or more cameras at one time and have them in readiness for instant use, without becoming entangled, the present invention employs a harness strap adapted to extend around the back of the neck and over the shoulders of the photographer, and from which harness strap are suspended the cameras in cascade fashion, the cameras being normally disposed one above the other over the wearer's chest. More particularly each camera forms a link between two like straps extending to the opposite ends of the harness, the straps being provided with swivels to permit rotation of each camera. To support a plurality of cameras one above the other, certain of the straps are of a greater length, and provided with adjustment to permit variation in length.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figure 1:
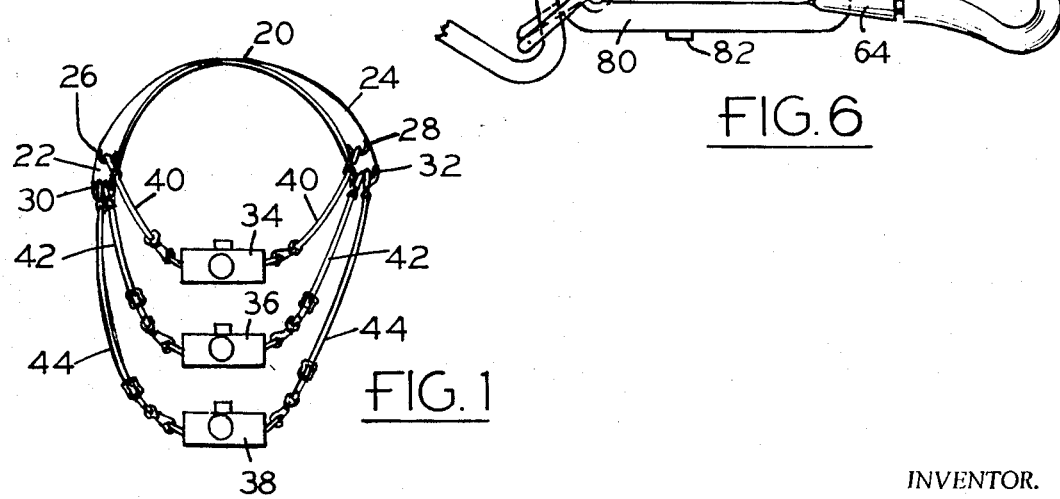
FIG. 1 is a front elevational view of the carrier fitted out to support three cameras, one above the other.

Referring to FIG. 1, there is shown a halter strap 20 adapted to extend around the back of the wearer's neck, with its opposite ends 22 and 24 extending forwardly over the right and left shoulders of the wearer respectively. From heavy metal "D" rings 26 and 28 and 30 and 32 stitched into the halter, cameras such as 34, 36 and 38, are hung through pairs of straps, such as 40, 42, and 44, each camera forming a link in its respective sling.

Referring more particularly to the halter, it will be seen that the same comprises a pair of spaced flexible leather straps 46 and 48, between which is disposed a reinforcing layer 50, having ample strength in tension. To the underside of the strap is affixed a soft strip of felt 52, which will have a comfortable bearing around and upon the wearer's neck and shoulders. The layers are suitably stitched together as is indicated at 54 and 56, and the open axially aligned ends 58 of the "D" rings, 26, 28, 30 and 32 are embedded between the reinforcing layer 50 and strap 48, and held in place by the heavy stitching 54 and 56. In practice, a halter of about 17 to 18 inches in overall length has been found to provide excellent results, and the rings have their ends pivotally embedded between the layers about 1½ and 3½ inches in from the ends.

Figure 2:
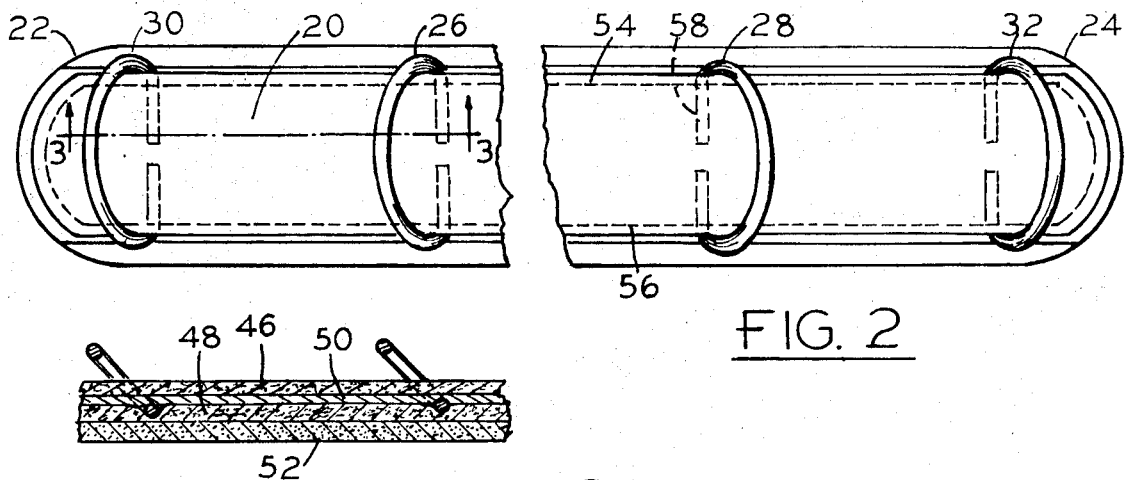
FIG. 2 is a plan view, broken in length, of the neck halter.
Figure 3:
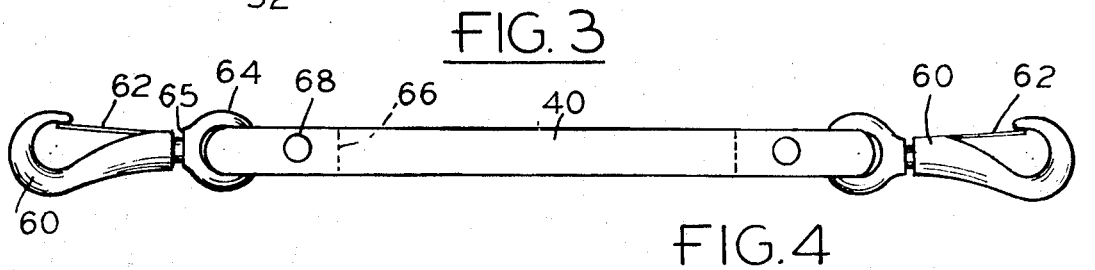
FIG. 3 is a fragmentary sectional view of one end of the halter taken substantially on the line 3—3 of FIG. 2.
Figure 4:
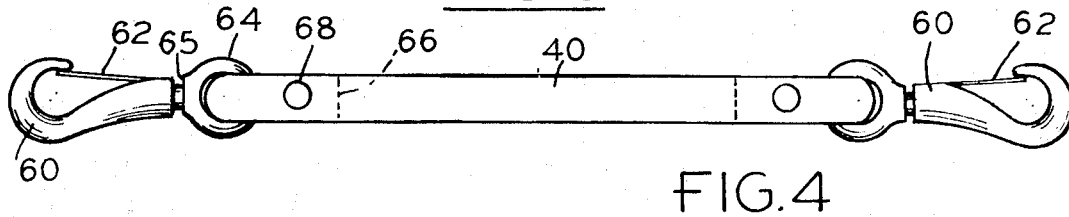
FIG. 4 is a plan view of one of a pair of shorter straps.

The strap 40 shown in FIG. 4, suitable for the upper camera 34, comprises at its opposite ends, like hooks 60 with spring tongue closures 62, which hooks are swivelly connected as at 65 to eyes 64, through which the strap ends 66 extend, the strap ends being secured in a loop by a rivet 68 or other suitable means. In practice two of such straps connect the eyes at the opposite ends of the camera to the "D" rings 26 and 28.

Figure 5:
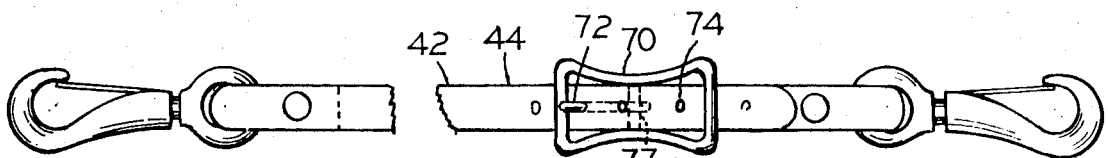
FIG. 5 is a plan view broken in length, of one of a pair of longer straps provided with a length adjustment.
Figure 6:
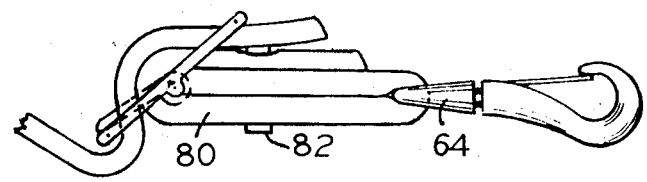
FIG. 6 is a side elevation of one end of the strap shown in FIG. 5.

The straps 42, and the longer straps 44, for supporting cameras 36 and 38, respectively are like the straps 40, except as shown in FIGS. 5 and 6, one end is provided with a buckle 70 having a tongue 72 which is adapted to engage in any one of a series of perforations 74 in the strap so that the length of the strap is readily adjusted whereby the cameras can be supported in slung position sufficiently spaced from each other. The buckle is held to the right-hand swivel by a length of strap 80 passed through the eye 64 of the swivel, and around the transverse pivot bar 77 of the buckle, the strap being secured by a rivet 82.

In practice the straps 40 may be about 5 inches in length, or about 7½ inches from hook to hook, whereas the straps 40 and 42 would be 10 inches and 12 inches in length, and about 12½ and 14½ inches respectively between hooks, it being understood that their lengths will be readily adjusted to suit cameras.

From the foregoing it can be seen that by means of the harness, any camera can be quickly lifted from its suspension position for viewing through the camera finder, and exposure, the camera being fully rotatable about its longitudinal axis by reason of the swivels at the snap hooks.

While both cameras 36 and 38 are hung from a single pair of "D" rings 30 and 32, they are readily slung in suitably spaced relation, out of danger of contact with one another, by the proper adjustment of their respective strap lengths. Any camera may be quickly removed from the harness and replaced by another, or turned on its longitudinal axis to facilitate reloading or for any other operation. The is such as to provide the wearer with opportunity to take action pictures the instant the desirability arises without danger of entanglement.

While a single modification of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

1. A camera harness and camera in combination comprising a one-piece halter strap neckband adapted to extend around the back of a wearer's neck, with its ends extending over the shoulders, said neckband having at least one ring embedded in each of its opposite ends, and a pair of straps having swivel spring closed hooks at either end, each strap having an end hooked in a ring, and a free end connected to one eye of a pair of eyes disposed at the opposite ends of the camera.

2. A camera harness comprising a one-piece halter strap neckband adapted to extend around the back of a wearer's neck, with its ends extending over the shoulders, said neckband having at least one ring embedded in each of its opposite ends, and a pair of straps having swivel spring closed hooks at either end, each strap having an end hooked in a ring, and a free end adapted to be connected to one eye of a pair of eyes disposed at the opposite ends of a camera, said rings being disposed between elongated layers of leatherlike material, and the central back side of the neckband being provided with a soft felt cushion.

3. A camera harness comprising a neckband adapted to extend around the back of a wearer's neck, with its ends extending over the shoulders, said neckband having at least one ring embedded in each of its opposite ends, and a pair of straps having swivel spring closed hooks at either end, each strap having an end hooked in a ring, and a free end adapted to be connected to one eye of a pair of eyes disposed at the opposite ends of a camera, and wherein a second ring spaced from the end is provided adjacent each end of the harness and a second pair of straps is provided of lesser length, such straps having one end hooked into the rings spaced from the ends respectively.

4. A camera harness as set forth in claim 3 wherein an additional pair of straps of greater length are hooked into the end rings, whereby three cameras having end rings may be slung from the harness and hang at different levels spaced from one another.